(12) United States Patent
Hagerskans (10) Patent No.: US 12,479,449 B2
(45) Date of Patent: Nov. 25, 2025

(54) METHOD AND CONTROL UNIT FOR HANDLING SAFE STOP MODE OF A VEHICLE

(71) Applicant: Volvo Autonomous Solutions AB, Gothenburg (SE)

(72) Inventor: Jonas Hagerskans, Landvetter (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 233 days.

(21) Appl. No.: 18/001,202

(22) PCT Filed: Jun. 9, 2020

(86) PCT No.: PCT/EP2020/065978
§ 371 (c)(1),
(2) Date: Dec. 8, 2022

(87) PCT Pub. No.: WO2021/249627
PCT Pub. Date: Dec. 16, 2021

(65) Prior Publication Data
US 2023/0227054 A1 Jul. 20, 2023

(51) Int. Cl.
*B60W 50/08* (2020.01)
*B60Q 1/50* (2006.01)
*B60W 60/00* (2020.01)

(52) U.S. Cl.
CPC ........... *B60W 50/082* (2013.01); *B60Q 1/543* (2022.05); *B60W 60/0053* (2020.02);
(Continued)

(58) Field of Classification Search
CPC .. B60Q 1/543; B60T 13/745; B60W 2300/12; B60W 2300/15;
(Continued)

(56) References Cited

U.S. PATENT DOCUMENTS 5,204,814 A 4/1993 Noonan et al.
5,469,356 A * 11/1995 Hawkins .............. G05D 1/0038
318/591

(Continued)

FOREIGN PATENT DOCUMENTS

CN 111071143 A * 4/2020 ............... B60Q 1/26
DE 102017126513 A1 5/2019
(Continued)

OTHER PUBLICATIONS

Translation of CN111071143A (Year: 2018).*
(Continued)

*Primary Examiner* — Babar Sarwar
(74) *Attorney, Agent, or Firm* — Venable LLP; Jeffri A. Kaminski (57) ABSTRACT

A method performed by a control unit for handling safe stop mode of a vehicle. The control unit obtains an activation request for activating the safe stop mode. When the activation request has been obtained, the control unit verifies that all safety conditions of the vehicle are fulfilled. The control unit activates the safe stop mode when the activation request has been obtained and when all safety conditions are fulfilled. The control unit triggers at least one light source to be turned on when all safety conditions are fulfilled. After the safe stop mode has been activated, the control unit obtains an inactivation request for inactivating the safe stop mode of the vehicle. The control unit inactivates the safe stop mode of the vehicle when the inactivation request has been obtained.

13 Claims, 4 Drawing Sheets

(52) U.S. Cl.
CPC ... *B60W 2510/101* (2013.01); *B60W 2510/18* (2013.01); *B60W 2540/215* (2020.02); *B60W 2710/18* (2013.01)

(58) Field of Classification Search
CPC ....... B60W 2510/101; B60W 2510/18; B60W 2510/186; B60W 2540/215; B60W 2710/18; B60W 2710/182; B60W 2710/188; B60W 50/082; B60W 60/0053
See application file for complete search history.

(56) References Cited

U.S. PATENT DOCUMENTS

| | | | | |
|---|---|---|---|---|
| 2005/0150701 | A1* | 7/2005 | Michi | B60W 30/17 180/170 |
| 2014/0371960 | A1* | 12/2014 | Lee | B60W 10/02 903/903 |
| 2017/0282784 | A1* | 10/2017 | Foster | B60Q 1/2611 |
| 2022/0032965 | A1* | 2/2022 | Feifel | B60W 30/095 |
| 2023/0106487 | A1* | 4/2023 | Alexander | B60W 50/16 340/576 |
| 2023/0192100 | A1* | 6/2023 | Alexander | B60W 40/09 701/1 |
| 2023/0195135 | A1* | 6/2023 | Kote | B60W 60/00253 701/23 |
| 2024/0059321 | A1* | 2/2024 | Kuroda | B60W 60/0015 |

FOREIGN PATENT DOCUMENTS

| | | | | |
|---|---|---|---|---|
| DE | 102018102795 | A1 | 8/2019 | |
| DE | 102018114383 | A1* | 12/2019 | ............... B60Q 1/18 |
| EP | 3571911 | A1* | 11/2019 | ............... G05D 1/60 |
| EP | B571911 | A1 | 11/2019 | |

OTHER PUBLICATIONS

International Search Report and Written Opinion in corresponding International Application No. PCT/EP2020/065978 mailed Mar. 3, 2021 (13 pages).
International Preliminary Report on Patentability in corresponding International Application No. PCT/EP2020/065978 mailed Sep. 30, 2022 (8 pages).

* cited by examiner

METHOD AND CONTROL UNIT FOR HANDLING SAFE STOP MODE OF A VEHICLE

CROSS-REFERENCE TO RELATED APPLICATIONS

This application is a U.S. National Stage application of PCT/EP2020/065978, filed Jun. 9, 2020 and published on Dec. 16, 2021, as WO/2021/249627, all of which is hereby incorporated by reference in its entirety.

TECHNICAL FIELD

The invention relates generally to a method, control unit and a vehicle. More particularly the invention relates to handling safe stop mode of the vehicle.

The invention can be applied in heavy-duty vehicles, such as trucks, buses and construction equipment, and which are adapted to operate in autonomous mode. Although the invention will be described with respect to a truck, the invention is not restricted to this particular vehicle, but may also be used in other vehicles such as buses, construction equipment, trucks, working machines, cars. The invention may be used in in any type of working machine within the fields of industrial construction machines or construction equipment, e.g. wheel loaders, articulated haulers, dump trucks, excavators and backhoe loaders etc.

BACKGROUND

An autonomous mode is today available in many vehicles. When a vehicle is in autonomous mode, it may be referred to as an autonomous vehicle or a self-driving vehicle. When a vehicle is in autonomous mode, it may for example accelerate, brake and steer itself. Further, in autonomous mode, the vehicle may sense its environment and navigate safely without human input or external control.

There are several levels of the autonomous mode in a vehicle which is in the range from no automation, via partial autonomous and up to fully autonomous. For example, when a vehicle is in an autonomous mode, some or all driving aspects of vehicle operation can be handled by a vehicle control system. In such cases, computing devices comprised onboard the vehicle and in a server network may be operable to carry out functions such as planning a driving route, sensing aspects of the vehicle, sensing the environment of the vehicle, and controlling drive functions such as steering, accelerating and braking. Thus, a vehicle in autonomous mode may reduce or eliminate the need for human interaction in various aspects of vehicle operation. A fully autonomous vehicle is able to perform all driving functions without supervision of a user and any external control.

When a user wants to enable autonomous mode in a vehicle, the start-up procedure is typically initiated by the user from within the vehicle cab. The autonomous part of the vehicle needs to be powered up, computers and sensors need to be activated, some self-diagnostics has to be performed and communication with an external control system, e.g. a site control system, has to be established. Since the user then needs to leave the vehicle, it is very important that this is done in a safe way. It is necessary to guarantee that the autonomous vehicle will not start to un-intentionally execute a mission and drive away creating a hazardous situation for the user. The same need occurs when a human needs to approach a vehicle that is in autonomous mode for e.g. picking it up or handle unplanned stops.

Therefore, there is a need to at least mitigate or solve the above issues.

SUMMARY

An object of the invention is to provide improved safety for a vehicle adapted to operate in autonomous mode.

The object is achieved by the method according to claim 1.

According to the first aspect, the object is achieved by a method performed by a control unit for handling safe stop mode of a vehicle. The control unit obtains an activation request for activating the safe stop mode. The vehicle cannot perform autonomous driving when the safe stop mode is activated. When the activation request has been obtained, the control unit verifies al safety conditions of the vehicle are fulfilled. The fulfilled safety conditions indicate that the vehicle cannot move. The control unit activates the safe stop mode when the activation request has been obtained and when all safety conditions are fulfilled. The control unit triggers at least one light source to be turned on when all safety conditions are fulfilled. After the safe stop mode has been activated, the control unit obtains an inactivation request for inactivating the safe stop mode of the vehicle. The control unit inactivates the safe stop mode of the vehicle. The vehicle can perform autonomous driving when the safe stop mode is inactivated.

The present disclosure affords many advantages, of which a non-exhaustive list follows:

Since the safe stop mode is activated when all safety conditions are fulfilled, it is ensured that the vehicle cannot perform autonomous driving. The safety conditions may be that the parking brake is applied, that the gear box is in neutral gear etc., which are conditions that, when fulfilled, prevents the vehicle from performing autonomous driving. When the safe stop mode is activated based on e.g. that a user inside the vehicle activates an inside input device, the vehicle is considered safe since it cannot move. Thus, the user can safely go out of the vehicle knowing that the vehicle will not perform autonomous driving, e.g. the vehicle will not move while he exits the vehicle.

With the triggering of the light source, the user and any other persons surrounding the vehicle will understand that the safe stop mode is activated and that it is safe to exit and approach the vehicle without any risk for the vehicle performing unintentional autonomous driving. In other words, the light source indicates that the vehicle will not un-intentionally execute a mission and drive away creating a hazardous situation for the user.

With the possibility to inactivate the safe stop mode and thereby activate autonomous driving, e.g. by activation of an outside input device, it ensures that autonomous driving cannot be reactivated until the user is outside of the vehicle. Thus, safety is improved.

According to a second aspect, the object is achieved by a control unit configured to perform the method according to the first aspect. Effects and features of the second aspect are largely analogous to those described above in connection with the first aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings are not necessarily to scale and the dimensions of certain features may have been exaggerated for the sake of clarity. Emphasis is instead placed upon illustrating principles.

DETAILED DESCRIPTION OF EXAMPLE EMBODIMENTS OF THE INVENTION

Figure 1:
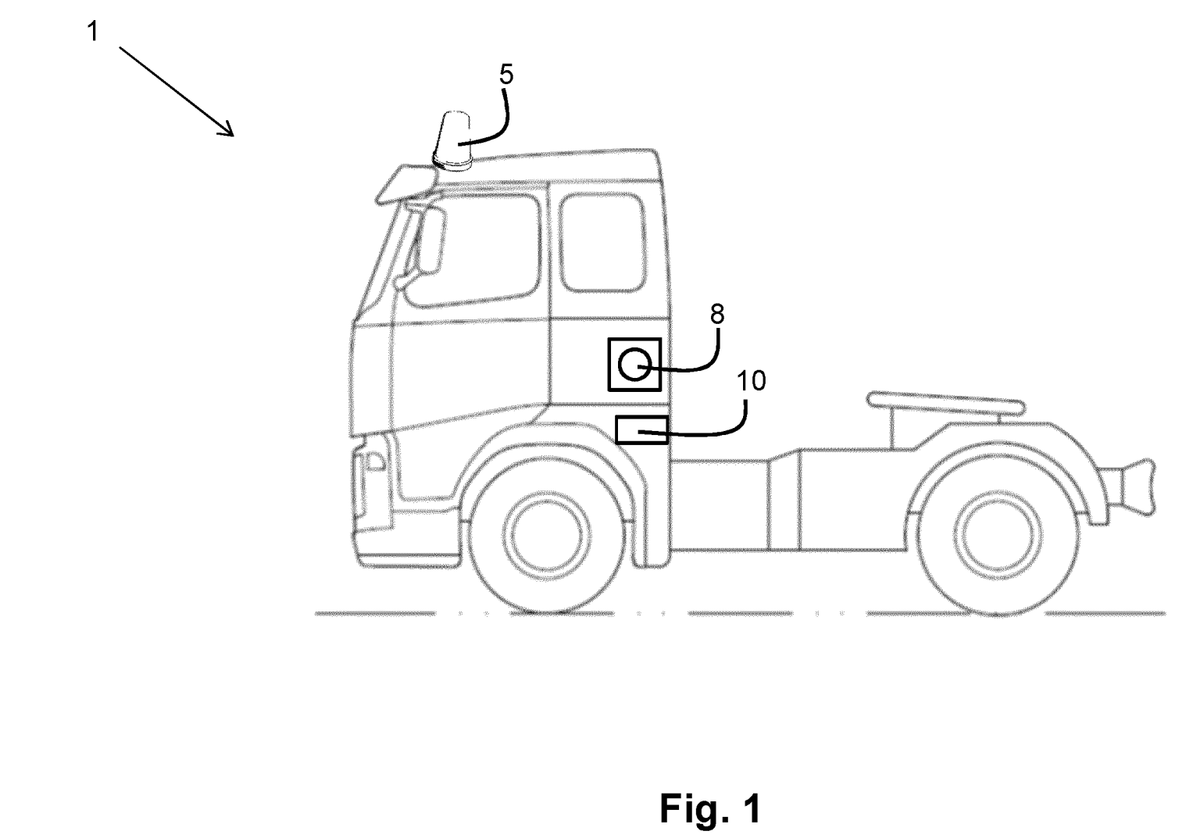
FIG. 1 is a schematic drawing of a vehicle.

FIG. 1 is a schematic drawing illustrating a vehicle 1 seen from the side. As mentioned above, the vehicle 1 may be a heavy-duty vehicle, such as truck, bus and construction equipment, working machine, but also a car. The invention may be used in in any type of working machines within the fields of industrial construction machines or construction equipment, e.g. wheel loaders, articulated haulers, dump trucks, excavators and backhoe loaders etc. The vehicle 1 is adapted to operate in autonomous mode, i.e. it has autonomous driving capability.

The vehicle 1 comprises a control unit 10. The control unit 10 is adapted to handle safe stop mode of the vehicle 1, e.g. by activating and inactivating the safe stop mode. Activating the safe stop mode may be described as enabling the safe stop mode, and inactivating the safe stop mode may be described as disabling the safe stop mode. When the safe stop mode is activated, the vehicle 1 does not perform autonomous driving. In other words, when the safe stop mode is activated, the vehicle 1 will not un-intentionally execute a mission and drive away creating a hazardous situation for the user. The autonomous mode can be enabled as the same time as the safe stop mode is activated, but the vehicle 1 will not perform autonomous driving since the safe stop mode is activated. The autonomous mode can be disabled when the safe stop mode is activated.

The control unit 10 may be located in any suitable location of the vehicle 1, for example in the cab, in the luggage compartment etc. The control unit 10 may be a Programmable Logic Controller (PLC), a safety PLC etc. The control unit 10 may be a safety classified unit, which is different from the autonomous driving system of the vehicle 1 which is not safety classified.

The vehicle 1 comprises at least one light source 5 adapted to emit light, it is "on", when triggered by the control unit 10. The at least one light source 5 may be located on the outside of the vehicle 1, e.g. on the cab roof as exemplified in FIG. 1, on the front part of the vehicle 1, on the back of the vehicle 1, inside the vehicle 1 etc. There may be one, two or more light sources 5 comprised in the vehicle 1, for example two light sources 5 on the cab roof and one inside the cab, or one light source 5 on the cab roof and one inside the cab, only one light source 5 in the cab etc.

When the at least one light source 5 emits light, it is "on", it may indicate that it is safe to approach the vehicle 1, meaning that the vehicle 1 is in safe stop mode and will not perform any autonomous driving while the at least one light source 5 is on. When the at least one light source 5 does not emit light, it is "off", it may indicate that the safe stop mode is inactive and the vehicle 1 may perform autonomous driving.

The at least one light source 5 may emit light in one or more suitable colours, e.g., green, red, yellow, orange etc. For example, when the at least one light source 5 emits light in a first colour, e.g. green, it may indicate that safe stop mode is activated and that it is safe to exit or approach the vehicle 1. When the at least one light source 5 emits light in a second colour, e.g. red, it may indicate that the safe stop mode is inactive and that it is not safe to exit or approach the vehicle since the vehicle 1 may perform autonomous driving.

The at least one light source 5 may emit light in a constant fashion or it may emit light in pulses etc.

The vehicle 1 comprises an outside input device 8 located on the outside of the vehicle 1. The outside input device 8 is adapted to receive input, e.g. from a user or from another device or unit comprised in the vehicle 1. The input device 8 may be in the form of a switch (hardware or software switch), a button, a key, a lever etc. The outside input device 8 is adapted to be activated for example by a user. Activating the outside input device 8 may comprise receiving input from the user, where the input may be in the form of that the user presses the outside input device 8, that the user provides a command to the input device 8. The outside input device 8 may be located at any suitable location on the outside of the vehicle 1 and where it is accessible to the user, for example on the side of the cab. The outside input device 8 is adapted to communicate with the control unit 10 via a wired or wireless link.

Figure 2:
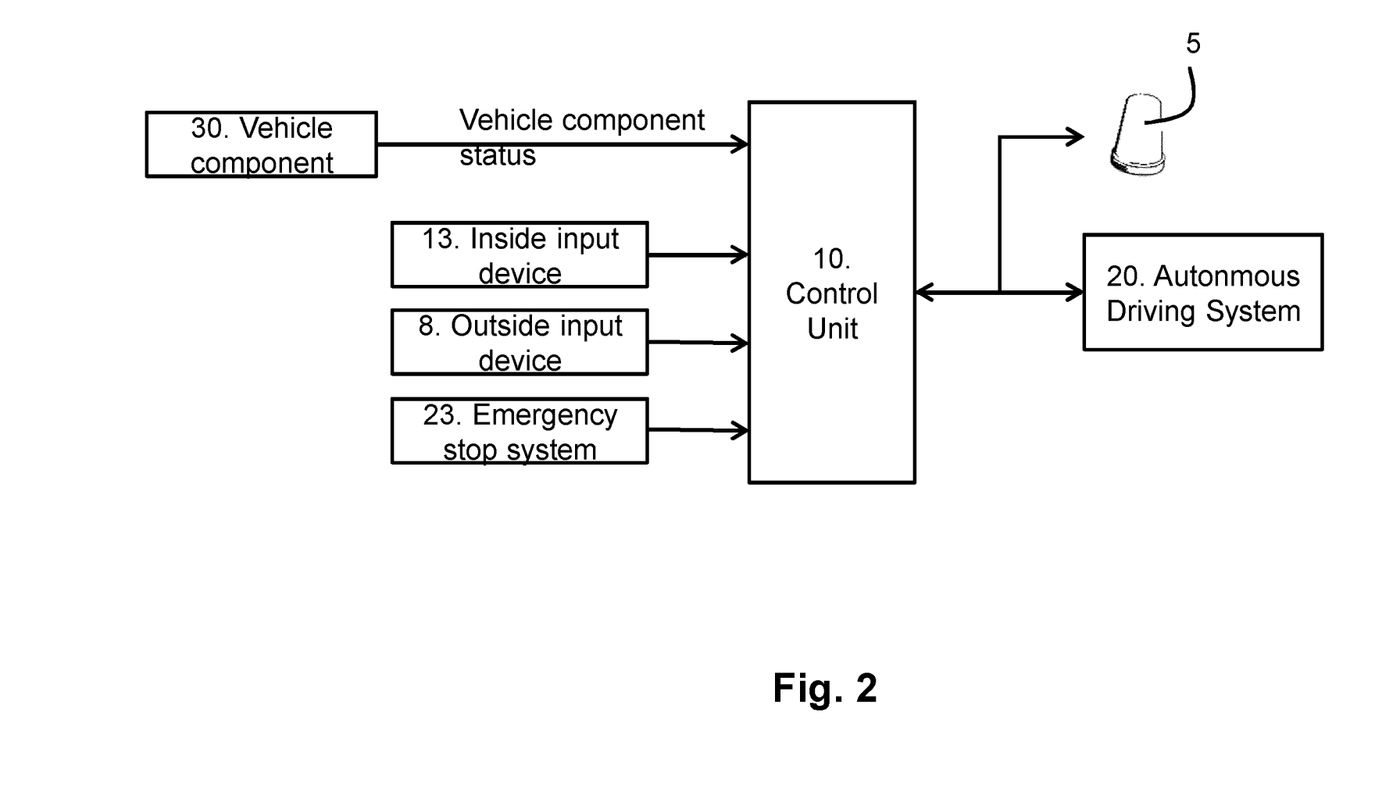
FIG. 2 is a schematic block diagram illustrating a control unit.

Now turning to FIG. 2 which provides more details regarding the control unit 10 compared to FIG. 1. In addition to the units described above with reference to FIG. 1, the vehicle 10 comprises one or more of the units illustrated in FIG. 2. FIG. 2 is a schematic diagram illustrating the control unit 10 and other units in the vehicle 1.

As seen in FIG. 2, the vehicle 1 comprise an inside input device 13 located inside the vehicle 1. Activating the inside input device 13 may comprise receiving input from the user, where the input may be in the form of that the user presses the input device 8, that the user provides a command to the inside input device 13. The inside input device 13 is adapted to receive input, e.g. from a user or from another device or unit comprised in the vehicle 1. The inside input device 13 may be in the form of a switch (hardware or software switch), a button, a key, a lever, etc. The inside input device 13 may be a manually operable switch located within the cab of the vehicle 1. The inside input device 13 is adapted to be activated for example by a user. The inside input device 13 may be located at any suitable location on the inside of the vehicle 1 and where it is accessible to the user, for example on a display inside the cab, on the dashboard inside the cab etc. The inside input device 13 is adapted to communicate with the control unit 10 via a wired or wireless link. Thus, the vehicle 1 comprises two input devices, an inside input device 13 and an outside input device 8.

The vehicle 1 comprises an autonomous system 20 which is adapted to control the vehicle 1 when it is in autonomous mode. The autonomous system 20 and the control unit 10 are adapted to communicate with each other, e.g. via a wired or wireless link, and adapted to function in parallel with each other. Thus, the autonomous system 20 and the control unit 10 are separate units. The autonomous system 20 may be referred to as an autonomous driving system.

The vehicle 1 comprises vehicle components 30 such as brakes, parking brake, gear box, motor, communication links, etc. Information indicating status of one or more vehicle components 30 may be provided to the control unit 10, directly from the vehicle components 30 or via some intermediate unit. The intermediate unit may be an Engine Control Unit (ECU), e.g. a BodyBuilderControl ECU. The information indicating the status may indicate for example that the parking brake is applied, that the gear box is in neutral gear, that a parking brake release inhibiting function of the vehicle 1 is active, that a vehicle motor is off, that vehicle brakes are applied etc. The vehicle components 30 may be updated to be controlled by and to communicate with the control unit 10 and the autonomous system 20.

The vehicle 1 may comprise an emergency stop system 23 which may be adapted to communicate with the control unit 10, and possibly also the autonomous system 20. The emergency stop system 23 may be adapted to slow down the vehicle 1, or brake to a complete stop, for example if the vehicle 1 is about to crash into another vehicle or an obstacle.

The method for handling safe stop mode of a vehicle 1 performed by the control unit 10 will now be described with reference to the flowchart depicted in FIG. 3. As mentioned above the control unit 10 may be separate from and functioning in parallel with the autonomous system 20 of the vehicle 1. The method comprises at least one of the following steps, which steps may as well be carried out in another suitable order than described below:

Step 301

The control unit 10 obtains an activation request for activating, e.g. enabling, the safe stop mode. As mentioned above, the vehicle 1 cannot perform autonomous driving when the safe stop mode is activated.

The input to the inside input device 13 is the activation request obtained from the user. The activation request may be an activation command, activation instructions, enabling command, enabling instructions etc.

The activation request may be obtained from at least one of:
- the autonomous system 20 comprised in the vehicle 1,
- an emergency stop system 23 comprised in the vehicle 1, and
- the inside input device 13 being activated by a user.

Step 302

When the activation request has been obtained, the control unit 10 verifies that all safety conditions of the vehicle 1 are fulfilled. The fulfilled safety conditions indicate that the vehicle 1 cannot drive, i.e. it will not move. When all safety conditions are met, the vehicle 1 is considered to not be able to move and therefore considered safe.

In order to be able to verify fulfilment of all safety conditions, the control unit 10 may obtain, regularly, upon request, or continuously, status signals for one or more vehicle components associated with vehicle safety. The vehicle components may be for example a parking brake, gearbox, motor etc.

There may be one, two or more safety conditions of the vehicle 1 that may be fulfilled. Thus, the term "all" in "all safety conditions" comprises that one, two or more safety conditions are fulfilled. Below is a non-exhaustive list of fulfilled safety conditions, and one, two or more of these may be fulfilled when all safety conditions are deemed to be fulfilled.

The safety condition may be fulfilled when at least one of:
- a parking brake 25 of the vehicle 1 is applied,
- a gearbox of the vehicle 1 is in neutral gear,
- a parking brake release inhibiting function of the vehicle 1 is active,
- a vehicle motor is off;
- at least one vehicle brake is applied.

As mentioned above, the list is non-exhaustive which implies that there may be additional safety conditions that are applicable, but not mentioned herein.

Summarized, the vehicle 1 may be associated with a number of safety conditions. The number of safety conditions may be any suitable number, e.g. one, two or more safety conditions. For example, if vehicle 1 is associated with two of the safety conditions in the non-exhaustive list above, then all safety conditions may be considered fulfilled when these two are fulfilled. In another example, if the vehicle is associated with five of the safety conditions in the non-exhaustive list above, then all safety conditions may be considered fulfilled when the five safety conditions are fulfilled. In a further example, if the vehicle 1 is associated with one of the safety conditions in the non-exhaustive list above, then all safety conditions may be considered fulfilled when the one safety condition is fulfilled.

There may be one, two, three, more safety conditions that needs to be fulfilled. A subset of the safety conditions or all safety conditions may need to be fulfilled.

Step 303

The control unit 10 activates the safe stop mode when the activation request has been obtained and when all safety conditions are fulfilled.

When the control unit 10 activates the safe stop mode, it may trigger at least one of:
- activation of a parking brake release inhibiting function of the vehicle 1;
- application of vehicle brakes;
- disconnect communication between the vehicle 1 and an autonomous system 20 comprised in the vehicle 1; and
- force neutral gear.

In step 303, the control unit 101 may request immobilization of the vehicle 1 by e.g. the Parking brake release inhibit function of disconnection of input devices while monitoring safety conditions such as Neutral gear engaged, Parking brake applied and ParkingBrakeReleaseInhibit Active.

When the safe stop mode has been activated in step 303, it is safe for the user to step out of the vehicle 1 since it the safe stop mode ensures that the vehicle 1 will not perform autonomous driving. Also, it will be safe for a user to approach the vehicle 1 when it is in safe stop mode.

Step 304

The control unit 10 may provide, to the autonomous system 20 of the vehicle 1, information indicating whether the safe stop mode is activated or inactivated, e.g. enabled or disabled. This step 204 may be performed after step 301, 302 or 303 in case of activation of the safe stop mode, and after step 305, 306, 307 or 308 in case of inactivating of the safe stop mode.

Step 305

The control unit 10 triggers at least one light source 5 to be turned on or to emit light of a first colour, e.g. green, when all safety conditions are fulfilled.

If there is at least one light source 5 inside the vehicle 1, then the user, when he is inside the vehicle 1 and the safe stop mode has been activated, knows that it is safe to exit the vehicle 1 when the at least one light source 5 is turned on or emits a light of the first colour. If there is at least one light source 5 on the outside of the vehicle 1, then the user, when he is outside the vehicle 1 and wants to approach it, knows that it is safe to approach it when the light source is turned on or emits a light of the first colour.

The triggering of the at least one light source 5 may be described as a confirmation of that the safe stop mode has been activated, and possibly also that the autonomous driving will not take place.

Step 306

After the safe stop mode has been activated, the control unit 10 obtains an inactivation request, e.g. disabling request, for inactivating the safe stop mode of the vehicle 1. The input to the inside input device 13 and the outside input device 8 is the inactivation request obtained from the user. The inactivation request may be an inactivation command, inactivation instructions, disabling command, disabling instructions etc.

The inactivation request may be obtained from at least one of:
 the inside input device 13 being activated by a user, and
 the outside input device 8 being activated by the user.

For example, if the safe stop mode is activated, the user is inside the vehicle 1 and wants to take control of the vehicle 1, the user may inactivate the safe stop mode by providing the inactivating request, e.g. by activating the inside input device 13.

For example, if the safe stop mode is activated, the user is outside the vehicle 1 and wants to activate autonomous driving, the user may inactivate the safe stop mode by providing the inactivating request, e.g. by activating the outside input device 8.

The inactivation request may be obtained by that the user performs an action, e.g. pushes the inside input device 13 or the outside input device 8.

Step 307

The control unit 10 inactivates the safe stop mode of the vehicle 1 when the inactivation request has been obtained. The vehicle 1 can perform autonomous driving when the safe stop mode is inactivated.

Step 308

The control unit 10 may trigger inactivation of a parking brake release inhibiting function of the vehicle 1 when the inactivation request has been obtained.

Step 309

The control unit 10 may trigger the at least one light source 5 to be turned off when the inactivation request has been obtained, or to emit a light of a second colour indicating that the safe stop mode is inactivated. This step 309 may be performed after step 306, 307 or 308.

Figure 3:
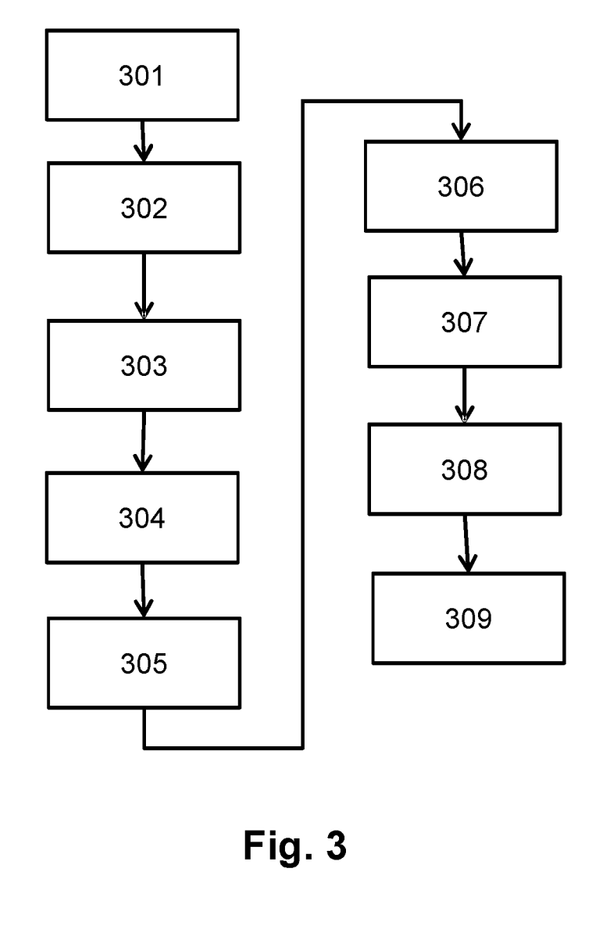
FIG. 3 is a flow chart illustrating a method.

A computer program may comprise program code means for performing one or more of the steps described herein with reference to FIG. 3, when said program is run on a computer.

A computer readable medium may carry a computer program comprising program code means for performing the one or more of the steps described herein with reference to FIG. 3 when said program product is run on a computer.

The computer program, comprising instructions, i.e., software code portions, which, when executed on at least one processor, cause the at least one processor to carry out the method described herein, as performed by the control unit 10. The computer program may be stored on a computer-readable storage medium. The computer-readable storage medium, having stored thereon the computer program, may comprise instructions which, when executed on at least one processor, cause the at least one processor to carry out the actions described herein, as performed by the control unit 10. The computer-readable storage medium may be a non-transitory computer-readable storage medium, such as a CD ROM disc or a memory stick. The computer program product may be stored on a carrier containing the computer program just described, wherein the carrier is one of an electronic signal, optical signal, radio signal, or the computer-readable storage medium, as described above.

The control unit 10 may comprise a communication interface configured to facilitate communications between the control unit 10 and other units or components, e.g., the ECU, the autonomous system 20, or another structure. The interface may comprise a transceiver configured to transmit and receive signals over a wired or wireless interface in accordance with a suitable standard.

The control unit 10 is configured to perform the method as described herein.

The method for handling safe stop mode of a vehicle 1 described herein may be implemented through one or more processors, such as a processor in the control unit 10, together with computer program code for performing the method described herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the present disclosure herein when being loaded into the control unit 10. One such carrier may be in the form of a CD ROM disc. It is however feasible with other data carriers such as a memory stick. The computer program code can be provided as pure program code on a server and downloaded to the control unit 10.

The control unit 10 may comprise a memory comprising one or more memory units. The memory is arranged to be used to store information, status, mode information, requests, schedulings, and applications etc. to perform the methods herein when being executed in control unit 10.

A control system may comprise the control unit 10 as described herein, at least one light source 5 and at least one input device 8, 13.

A vehicle 1 comprises the control unit 10 as described herein.

Figure 4:
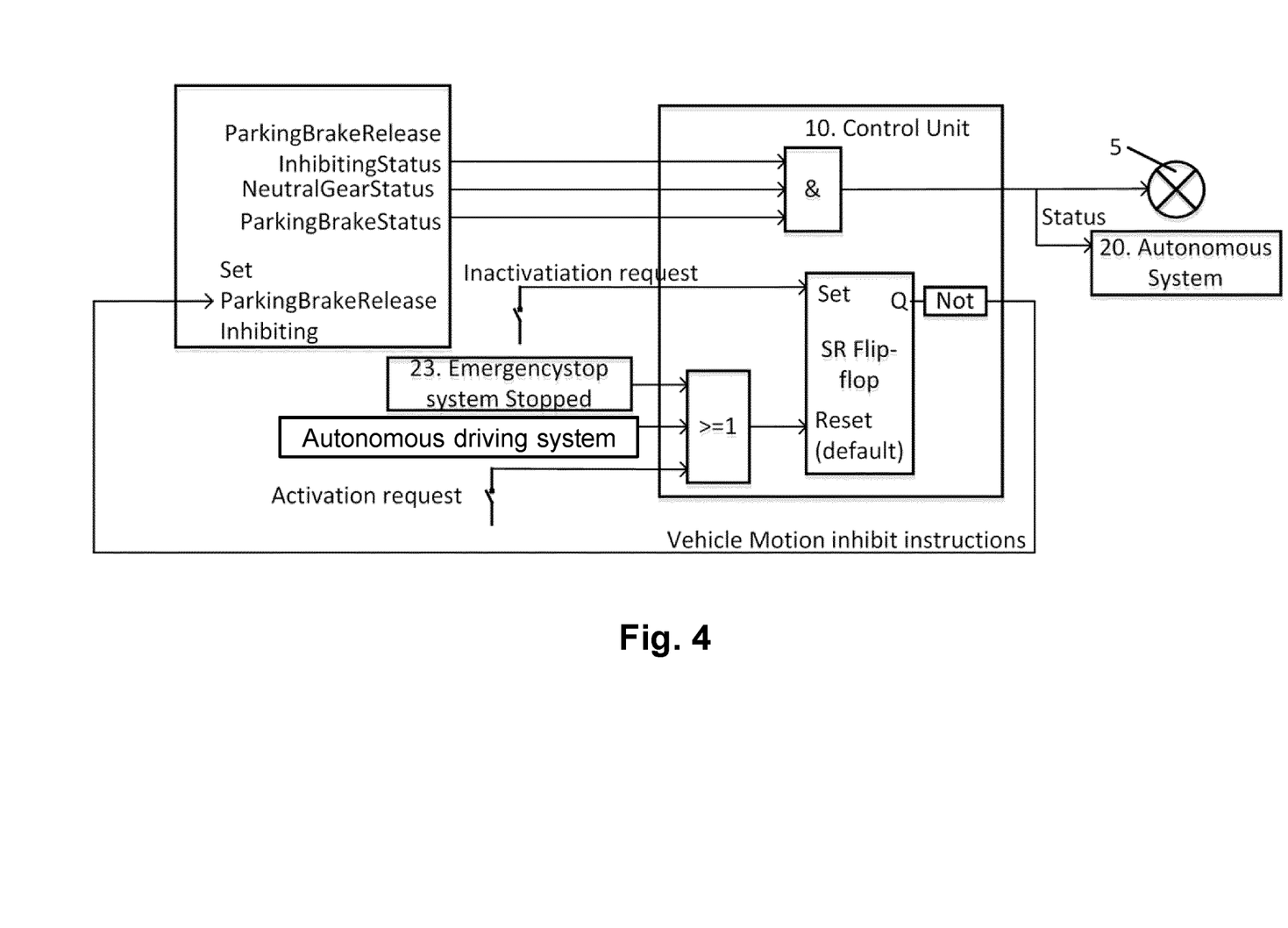
FIG. 4 is a schematic block diagram illustrating a control unit.

FIG. 4 is a schematic block diagram illustrating an example of the control unit 10. FIG. 4 shows that the safety conditions may be parking break release inhibit status, neutral gear status and parking break status. Note that the safety conditions are not limited to the ones illustrated in FIG. 4, and also not limited to the number of safety conditions illustrated in FIG. 4. The status of the safety conditions may be obtained by the control unit 10. The &-symbol in FIG. 4 illustrates that all safety conditions are fulfilled. When the safety conditions are fulfilled, the safe stop mode is activated. Then, the at least one light source 5 is triggered to emit light. The status of the safe stop mode may be provided to the autonomous system 20.

The example of FIG. 4 shows that the inactivation request is obtained, e.g. a user disable command is obtained or set. When it is set, the control unit 10 may trigger setting of the parking break release inhibiting function or any other suitable function that, when set, guarantees that the vehicle 1 will remain standstill, i.e. that it will not drive autonomously, FIG. 4 shows inactivation and activation of the safe stop mode. When the emergency stop system is stopped, the autonomous driving system is of a certain status and the activation request is obtained, indicated by being larger or equal to 1 in FIG. 4, the control unit 10 resets the safe stop mode. Resetting the safe stop mode may be the same as activating the safe stop mode. Activated safe stop mode may be a default situation. FIG. 4 also illustrates that the inactivation request is set. The inactivation request may be a user disable command. The term SR flip-flop in FIG. 4 represents Set-Reset flip-flop. The activation request may be a user enable command. Vehicle motion inhibit instructions may be provided as input to setting of the parking break release inhibiting function.

Some embodiments may be summarized as follows:

The safe stop mode guarantees that the vehicle 1 is safe to approach or leave, even if the vehicle 1 is in autonomous mode.

The vehicle 1 is considered safe if it cannot move. To guarantee it to be safe, one or more safety conditions need to be fulfilled. The fulfilled safety conditions may be for example that the parking brake is applied, the gearbox is in neutral gear and a specific parking brake release inhibiting function is active that prevents the parking brake from being released.

Status signals which indicate the safety conditions may be available directly from the vehicle components 30 or from an ECU in the vehicle 1. One way of monitoring the safety conditions instead of relying on an ECU may be to use safety classified sensors to directly monitor the status. E.g. pressure sensor in the parking brake circuit. Possibly also a double sensor for redundancy and increasing the integrity level may be utilized.

The control unit 10 verifies the safety conditions and turns at least one light source 5, e.g. a green light, for the user meaning that the "Vehicle is in Safe Stop Mode".

The safe stop mode may be requested from several sources; the autonomous system 20 itself, the emergency stop system 23 or the user through an input device, e.g. the inside input device 13. When safe mode is requested, a request to activate the ParkingBrakeReleaseInhibiting function may be triggered. The ParkingBrakeReleaseInhibiting function may be a separate unit adapted to communicate with the control unit 10 or it may be comprised in the in the BodyBuilderControl ECU.

There may be different ways of guarantee that the vehicle 1 will remain standstill, i.e. that it will not drive autonomously, such as actively apply parking brake, e.g. purging the parking brake air circuit with solenoids, disconnect the communication from the autonomous system 20 to the vehicle base.

When the safe stop mode is activated, the user can safely leave the vehicle 1. One way to inactivate the safe stop mode may be by pressing another input device, e.g. the outside input device 8. Once stepped out, the user may now safely inactivate the sate stop mode and the vehicle 1 may enter autonomous mode fully and start to execute an autonomous mission.

If a user wants to approach the vehicle 1 when it drives autonomously, a request to activate the safe stop mode may be sent remotely, the at least one light source 5 may be lit and the user thereby knows that the vehicle 1 is safe to approach.

Once inside the vehicle 1, the user may inactivate the safe stop mode again using another input device, and take control of the vehicle 1.

The safe stop mode may be requested by the emergency stop system 23.

The status of the safe stop mode may be sent to the autonomous system 20. This way a vehicle motion manager function may react and prevent requests for motion to be executed. The vehicle motion manager function may be a function comprised in the autonomous system i.e. a unit that may have at least partly control of the vehicle 1.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

It is to be understood that the present invention is not limited to the embodiments described above and illustrated in the drawings; rather, the skilled person will recognize that many changes and modifications may be made within the scope of the appended claims. Various alternatives, modifications and equivalents may be used. A feature from one embodiment may be combined with one or more features of any other embodiment.

The invention claimed is:

1. A method performed by a control unit for handling safe stop mode of a vehicle in autonomous mode, wherein the method comprises:
   obtaining, from an inside input device being activated by a user, wherein the inside input device is located inside the vehicle, an activation request for activating the safe stop mode, wherein the vehicle cannot perform autonomous driving when the safe stop mode is activated, and wherein the autonomous mode is enabled at the same time as the safe stop mode is activated;
   when the activation request has been obtained, verifying that all safety conditions of the vehicle are fulfilled, wherein the fulfilled safety conditions indicates that the vehicle cannot move;
   activating the safe stop mode when the activation request has been obtained and when all safety conditions are fulfilled, wherein the activating the safe stop mode comprises disconnection of communication between the vehicle and an autonomous system comprised in the vehicle;
   triggering at least one light source located on the outside of the vehicle to be turned on when all safety conditions are fulfilled;
   after the safe stop mode has been activated, obtaining, from an outside input device being activated by the user, an inactivation request for inactivating the safe stop mode of the vehicle, wherein the outside input device is located on the outside of the vehicle; and inactivating the safe stop mode of the vehicle when the inactivation request has been obtained, wherein the vehicle can perform autonomous driving when the safe stop mode is inactivated.

2. The method according to claim 1, wherein inactivating the safe stop mode comprises:
triggering inactivation of a parking brake release inhibiting function of the vehicle when the inactivation request has been obtained.

3. The method according to claim 1, wherein the activating the safe stop mode comprises:
triggering at least one of:
activation of a parking brake release inhibiting function of the vehicle;
application of vehicle brakes.

4. The method according to claim 1, wherein the activation request for activating the safe stop mode is obtained from at least one of:
an autonomous system comprised in the vehicle, and
an emergency stop system comprised in the vehicle.

5. The method according to claim 1, wherein the inactivation request is obtained from:
an inside input device being activated by a user, wherein the inside input device is located inside the vehicle.

6. The method according to claim 1, wherein all safety conditions are fulfilled when at least one of:
a parking brake of the vehicle is applied,
a gearbox of the vehicle is in neutral gear,
a parking brake release inhibiting function of the vehicle is active,
a vehicle motor is off;
vehicle brakes are applied.

7. The method according to claim 1, comprising:
providing, to an autonomous driving system of the vehicle, information indicating whether the safe stop mode is activated or inactivated.

8. The method according to claim 1, comprising:
triggering the at least one light source to be turned off when the inactivation request has been obtained.

9. The method according to claim 1, wherein the control unit is separate from and functioning in parallel with an autonomous driving system of the vehicle.

10. A non-transitory computer readable medium carrying a computer program comprising program code for performing the method of claim 1 when said program code is run on a computer.

11. A control unit configured to perform the method according to claim 1.

12. A control system comprising the control unit according to claim 11, at least one light source and at least one input device.

13. A vehicle comprising a control unit according to claim 11.

* * * * *